US008235562B2

(12) United States Patent
Chen

(10) Patent No.: US 8,235,562 B2
(45) Date of Patent: Aug. 7, 2012

(54) LIGHT-EMITTING DIODE ILLUMINATION APPARATUS

(75) Inventor: Jen-Shyan Chen, Hsinchu (TW)

(73) Assignee: Neobulb Technologies, Inc. (BN)

( * ) Notice: Subject to any disclaimer, the term of this patent is extended or adjusted under 35 U.S.C. 154(b) by 301 days.

(21) Appl. No.: 12/596,033

(22) PCT Filed: Apr. 27, 2007

(86) PCT No.: PCT/CN2007/001409

§ 371 (c)(1), (2), (4) Date: Oct. 15, 2009

(87) PCT Pub. No.: WO2008/131584

PCT Pub. Date: Nov. 6, 2008

(65) Prior Publication Data

US 2010/0117534 A1 May 13, 2010

(51) Int. Cl.
*B60Q 1/06* (2006.01)

(52) U.S. Cl. ........................................ 362/373; 362/294

(58) Field of Classification Search .................. 362/373, 362/294, 800

See application file for complete search history.

(56) References Cited

U.S. PATENT DOCUMENTS

| | | | | |
|---|---|---|---|---|
| 6,465,961 | B1 | 10/2002 | Cao | |
| 6,897,486 | B2 | 5/2005 | Loh | |
| 7,083,305 | B2 | 8/2006 | Galli | |
| 7,547,124 | B2 * | 6/2009 | Chang et al. | 362/373 |
| 7,946,737 | B2 * | 5/2011 | Liu | 362/373 |
| 8,007,143 | B2 * | 8/2011 | Liu | 362/373 |
| 8,029,158 | B2 * | 10/2011 | Chen | 362/249.02 |
| 2004/0213016 | A1 * | 10/2004 | Rice | 362/547 |
| 2005/0231983 | A1 | 10/2005 | Dahm | |
| 2005/0279949 | A1 | 12/2005 | Oldham | |
| 2006/0092639 | A1 | 5/2006 | Livesay | |
| 2006/0100496 | A1 | 5/2006 | Avron | |

* cited by examiner

*Primary Examiner* — Thuy Vinh Tran

(74) *Attorney, Agent, or Firm* — Thomas, Kayden, Horstemeyer & Risley, LLP.

(57) ABSTRACT

The invention provides a light-emitting diode illumination apparatus. The light-emitting diode illumination apparatus includes a tube, a chamber, a porous capillary diversion layer, at least one heat-dissipating fin, and a diode light-emitting module. The tube has a first opening. The chamber has a second opening and a flat end. The second opening is engaged to the first opening. The porous capillary diversion layer is formed in the tube and the chamber. The tube and the chamber form a sealed space. The sealed space accommodates a working fluid. A section area of the chamber is larger than a section area of the tube. The at least one heat-dissipating fin is disposed on a circumference of the tube. The diode light-emitting module is disposed on the flat end.

20 Claims, 6 Drawing Sheets

LIGHT-EMITTING DIODE ILLUMINATION APPARATUS

CROSS-REFERENCE TO RELATED APPLICATION

This national phase application claims priority to PCT/CN2009/001409, international filing date 27 Apr. 2007, which is incorporated herein by reference.

BACKGROUND OF THE INVENTION

1. Field of the Invention

The present invention relates to a light-emitting diode illumination apparatus, and more particularly, relates to a light-emitting diode illumination apparatus having a heat pipe with different section areas.

2. Description of the Prior Art

With the development of semi-conductor light emitting devices, a light-emitting diode (LED) becomes a new light source. It has several advantages, for example, saving power, seismic resistance, being short in reaction time, being proper in mass production and so on. Therefore, LEDs are widely used as indicator lights and it is a trend to use LEDs as a light source of illumination products.

LEDs as a light source have to provide enough illumination. It means it is necessary to use a lot of low-power LEDs or to use a small number of high-power LEDs. When a lot of low-power LEDs are used as a light source, it can reduce the requirement of unit heat-dissipating efficiency, so as to reduce the requirement of heat-dissipating devices but increase the total volume thereof. Therefore, using a lot of low-power LEDs as a light source is not applicable to illuminating.

Additionally, high-power LEDs as a light source have to be equipped with a heat-dissipating device having a high heat-dissipating efficiency. The heat-dissipating device of the prior art usually carries a small number of high power light-emitting diode modules merely, so that the illumination is not enough especially for road lighting. Therefore, in the prior art, an independent high-power LED is equipped with its own heat-dissipating device and a few of the independent high-power LEDs are combined together to provide enough illumination. The volume of the above-mentioned structure is not small enough and the applications of the structure may be confined thereby.

Additionally, if a metal plate is used to carry several light-emitting diode modules and one or more heat pipes are inserted through the metal plate to indirectly conduct the heat generated by the light-emitting diode module in operation, the heat-conducting efficiency of the metal plate is lower than the heat-conducting efficiency of the heat pipes. Thereby the metal plate is a bottleneck of the whole heat-dissipating mechanism. Therefore, this kind of structure does not satisfy with the requirement of high heat-dissipating, for example, road lighting.

Moreover, even if a vapor chamber replaces the metal plates, the heat conducted by the vapor chamber still has to be taken away by other methods. It may use other heat pipes to touch the vapor chamber, so that the heat could be conducted from the vapor chamber to the heat pipes. Perhaps one or more heat-dissipating fan is set on the vapor chamber to dissipate the heat. For the former, because the touched area is a bottleneck of the heat-dissipating, the heat-dissipating efficiency is limited thereby. For the later, the volume of the whole apparatus is huge and the variability of the structure is smaller; for example, the heat-dissipating fan has to be set on the vapor chamber directly for dissipating heat effectively.

Additionally, the later still needs extra energy to drive the heat-dissipating fan and the heat-dissipating fan is not suitable to be exposed outdoors in order to obtain a higher heat-dissipating efficiency.

Therefore, a scope of the present invention is to provide a light-emitting diode illumination apparatus having a heat pipe with different section areas. The heat pipe has a flat end where one diode light-emitting module with a bigger heating area or several diode light-emitting modules could be carried. The light-emitting diode illumination apparatus could dissipate heat directly and rapidly for solving the above-mentioned problems.

SUMMARY OF THE INVENTION

A scope of the present invention is to provide a light-emitting diode illumination apparatus.

Another scope of the present invention is to provide to a light-emitting diode illumination apparatus having a heat pipe with different section areas.

A light-emitting diode illumination apparatus of the invention includes a tube, a chamber, a porous capillary diversion layer, at least one heat-dissipating fin, and a diode light-emitting module. The tube has a first opening. The chamber has a second opening and a flat end. The second opening is engaged to the first opening. The porous capillary diversion layer is formed in the tube and the camber. The tube and the chamber form a sealed space that accommodates a working fluid. A section area of the chamber is larger than a section area of the tube. Additionally, the at least one heat-dissipating fin is disposed on a circumference of the tube and the diode light-emitting module is disposed on the flat end. Therein the section area of the chamber means the section area of the flat end.

In an embodiment, the tube and the chamber are formed in one piece. In another embodiment, the chamber includes a recess and a cover which is engaged to the recess and has the second opening. Therein, the chamber is made through a process of powder metallurgy process, stamping process, injection molding process, casting process, or machining process.

In an embodiment, the porous capillary diversion layer is made by sintering a copper powder, a nickel powder, a silver powder, a metallic powder plated with copper, nickel, or silver, or other similar metallic powders.

In another embodiment, the porous capillary diversion layer include a metallic particle layer and a metallic net, the metallic particle layer is formed on an inner wall of the tube and an inner wall of the chamber by sintering, and the metallic net is disposed on the metallic particle layer.

In another embodiment, the porous capillary diversion layer includes a wavy craped metal cloth and a flat metal net fabric layer, the wavy craped metal cloth is spread on an inner wall of the tube and an inner wall of the chamber, and the flat metal net fabric layer is disposed on the wavy craped metal cloth.

In another embodiment, the porous capillary diversion layer includes several tiny nicks formed on an inner wall of the tube and an inner wall of the chamber.

In another embodiment, the porous capillary diversion layer includes several tiny nicks and a sintered metal layer, the tiny nicks are formed on an inner wall of the chamber, and the sintered metal layer which is formed on an inner wall of the tube is welded with the tiny nicks.

The light-emitting diode illumination apparatus further includes a supporting member. The supporting member that includes a hole is disposed on the flat end and the diode light-emitting module is disposed in the hole. The supporting member is used for mounting the diode light-emitting module. Additionally, the diode light-emitting module includes a light-emitting diode or laser diode. The diode light-emitting module could include a red light-emitting diode, a blue light-emitting diode, a green light-emitting diode or a white light-emitting diode. The light-emitting diode illumination apparatus further include a control circuit module for controlling light emission of the diode light-emitting module. The light-emitting diode illumination apparatus could further include an optic module disposed above the diode light-emitting module for adjusting the light emitted by the diode light-emitting module. Additionally, a shape of the at least one heat-dissipating fin is irregular shape or disc.

Moreover, in an embodiment, the diode light-emitting module includes a substrate, at least one light-emitting diode die, and a substrate carrier. The at least one light-emitting diode die is disposed on the substrate and the substrate carrier includes a sunken portion where the substrate is disposed. Therein, the at least one light-emitting diode die is formed on the substrate through a flip-chip process and the substrate is made of a silicon material or a metallic material.

In another embodiment, the diode light-emitting module includes several substrates, several light-emitting diode dies, and a substrate carrier. The light-emitting diode dies are disposed on the substrates and the substrate carrier includes several sunken portions where the substrates are disposed respectively.

By the way, the engagement between the tube and the chamber of the light-emitting diode illumination apparatus is not limited to be symmetrical. Unsymmetrical engagement is more helpful to adapt different shapes of spaces.

Therefore, the light-emitting diode illumination apparatus could dissipate heat directly and rapidly through the sealed space which is formed by the tube the chamber. Moreover, the light-emitting diode illumination apparatus could carry a diode light-emitting module with a larger generating heat area or several diode light-emitting modules through the flat end of the chamber. In other word, the light-emitting diode illumination module of the present invent provides higher illumination and the volume of the light-emitting diode illumination apparatus is smaller than others relatively.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1A:
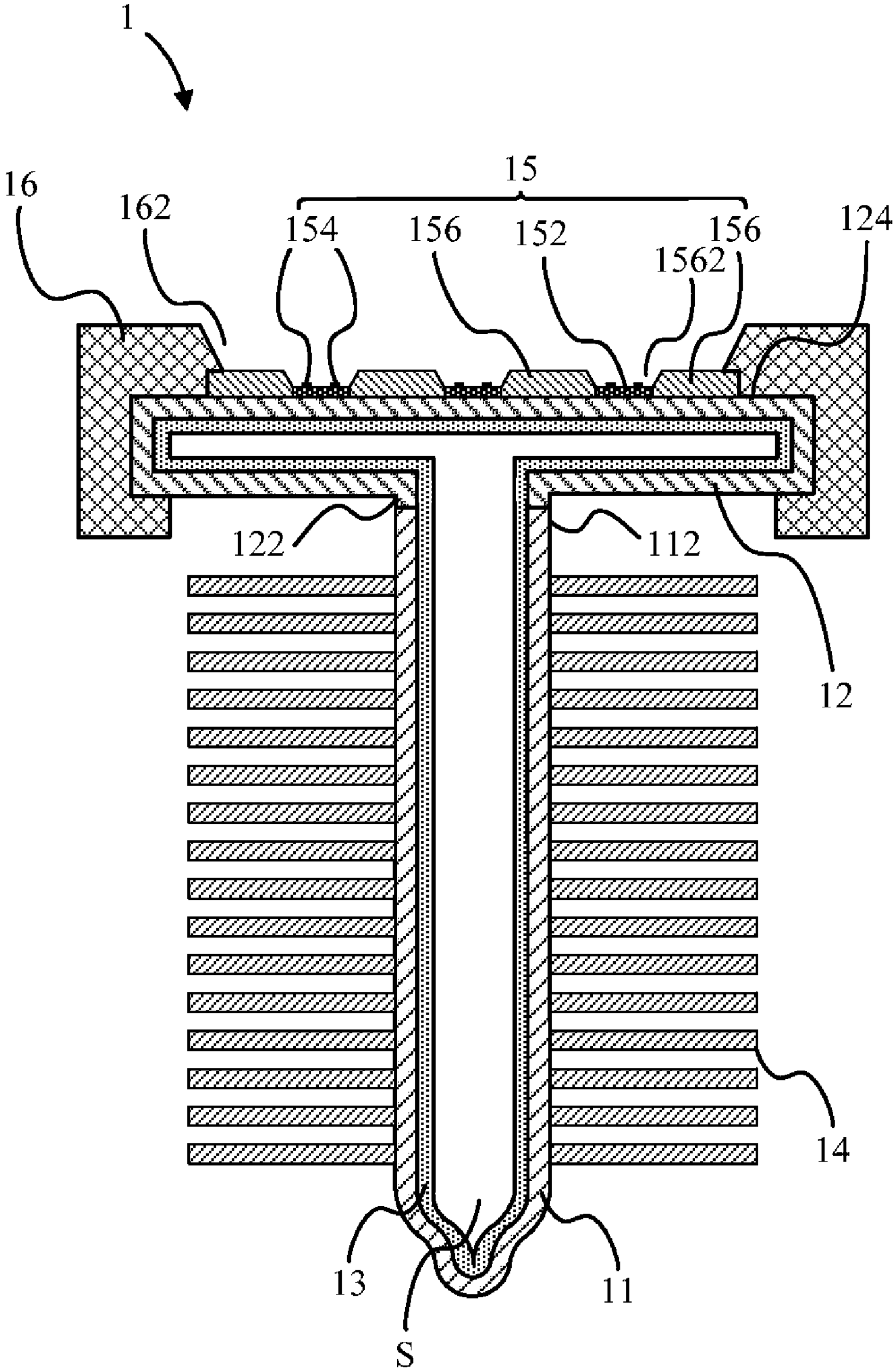
FIG. 1A illustrates a sectional drawing of a light-emitting diode illumination apparatus according to a preferred embodiment of the invention.
Figure 1B:
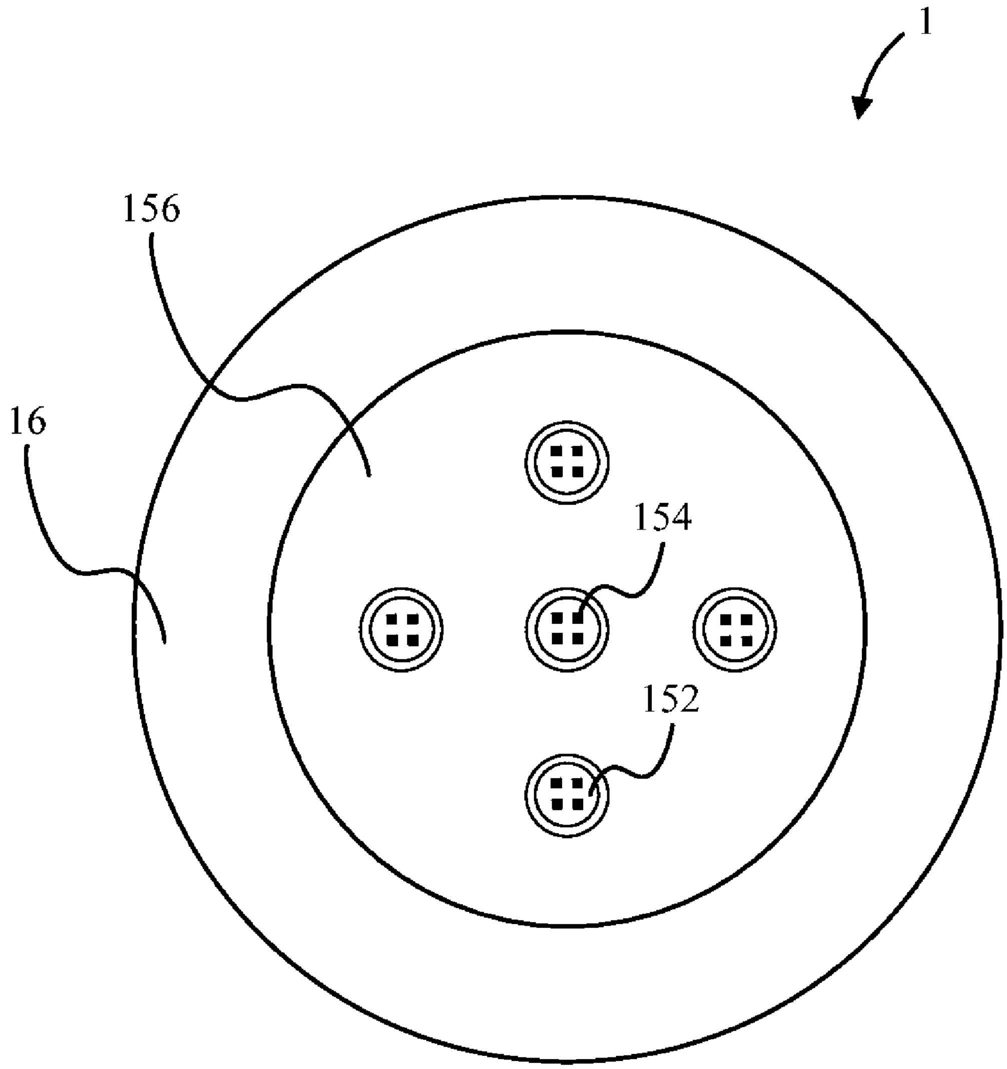
FIG. 1B illustrates a top view of the light-emitting diode illumination apparatus.

Please refer to FIG. 1A and FIG. 1B. FIG. 1A illustrates a sectional drawing of a light-emitting diode illumination apparatus 1 according to a preferred embodiment of the invention. FIG. 1B illustrates a top view of the light-emitting diode illumination apparatus 1.

Figure 2:
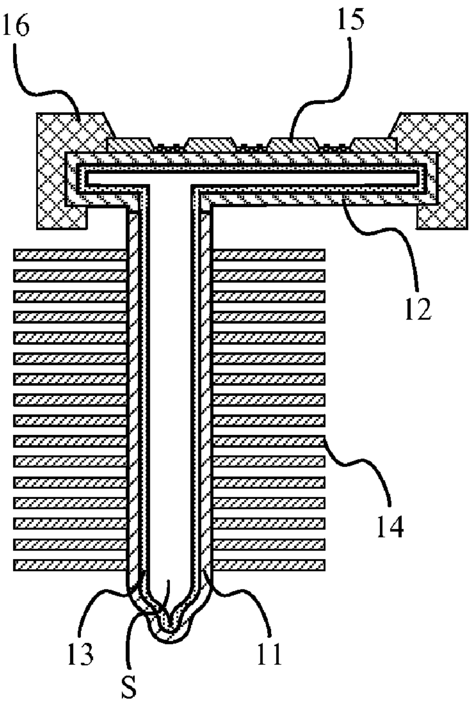
FIG. 2 illustrates a sketch diagram of another engaging structure of a tube and a chamber of the light-emitting diode illumination apparatus.

The light-emitting diode illumination apparatus 1 according to the preferred embodiment includes a tube 11, a chamber 12, a porous capillary diversion layer 13, several heat-dissipation fins 14, and several diode light-emitting modules 15. The tube 11 has a first opening 112. The chamber 12 has a second opening 122 and a flat end 124. The second opening 122 is engaged to the first opening 112. The porous capillary diversion layer 13 is formed in the tube 11 and the camber 12. The tube 11 and the chamber 12 form a sealed space S that accommodates a working fluid (not shown in figure). A section area of the chamber 12 is larger than a section area of the tube 11. Additionally, the heat-dissipating fins 14 are disposed on a circumference of the tube 11 and the diode light-emitting module 15 is disposed on the flat end 124. Therein, the section area of the tube 12 means the section area of the flat end 124. Additionally, the shape of the tube 11 is not limited in circle or rectangle and the engagement between the tube 11 and the chamber 12 is not limited to be symmetrical. Unsymmetrical engagement is more helpful to adapt different shapes of spaces, as shown in FIG. 2.

According to the preferred embodiment, the diode light-emitting module 15 includes several substrates 152, several light-emitting diode dies 154, and a substrate carrier 156. The light-emitting diode dies 154 are disposed on the substrates 152 and the substrate carrier 156 includes several sunken portions 1562 where the substrates 152 are disposed respectively. Therein the light-emitting diode dies 154 are formed on the substrate 152 through a flip-chip process and the substrate 152 is made of a silicon material or metallic material.

The light-emitting diode illumination apparatus 1 further includes a supporting member 16. The supporting member 16 that includes a hole 162 is disposed on the flat end 124 and the diode light-emitting module 15 is disposed in the hole 162. The supporting member 16 is used for mounting the diode light-emitting module 15. In practical application, one substrate carrier could carry only one substrate and several substrate carriers could be disposed on the flat end. Then a supporting member mounts the substrates carriers; therein the supporting member has several holes correspondingly to accommodate the substrate carriers.

Additionally, the diode light-emitting module 15 according to the preferred embodiment could include a light-emitting diode or a laser diode. The diode light-emitting module 15 could include a red light-emitting diode, a blue light-emitting diode, a green light-emitting diode or a white light-emitting diode, too and the light-emitting diode illumination apparatus 1 could further include a control circuit module (not shown in figure) for controlling light emission of the diode light-emitting module 15. The control circuit module controls the different colors of the light-emitting diodes to emit light, so that the light-emitting illumination apparatus 1 emits different hues of mixed light.

Figure 3:
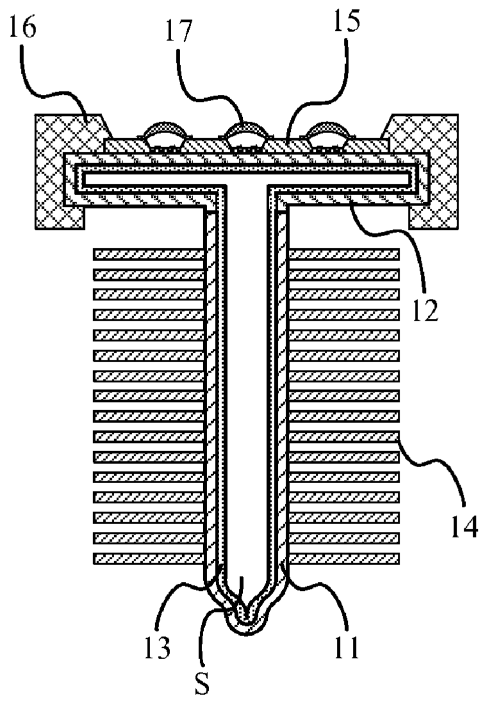
FIG. 3 illustrates a sketch diagram of setting several glass lenses on a diode light-emitting module of the light-emitting diode illumination apparatus.
Figure 4:
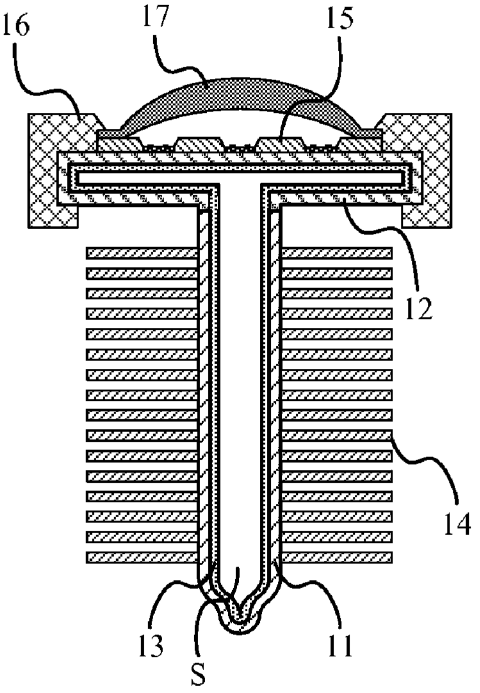
FIG. 4 illustrates a sketch diagram of setting a single glass lens on a diode light-emitting module of the light-emitting diode illumination apparatus.

The light-emitting diode illumination apparatus 1 could further include an optic module 17 disposed above the diode light-emitting module 15 for adjusting the light emitted by the diode light-emitting module 15. The optic module 17 could include several glass lenses disposed above the substrate 152 of the diode light-emitting module 15 respectively, as shown in FIG. 3. The optic module 17 could include a single glass lens disposed above the substrate carrier for covering all the light-emitting diode dies 154 simultaneous, as shown in FIG. 4.

Figure 5:
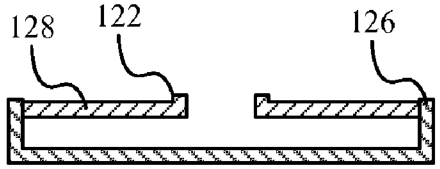
FIG. 5 illustrates a sketch diagram of the chamber of the light-emitting diode illumination apparatus.

Moreover, the tube 11 and the chamber 12 are formed in one piece and the chamber 12 includes a recess 126 and a cover 128, as shown in FIG. 5. The cover 128 has the second opening 122 and the cover 128 is engaged to the recess 126 to form the chamber 12. Therein, the recess 126 of the chamber 12 and the cover 128 are made through a process of powder metallurgy process, stamping process, injection molding process, casting process, or machining process.

According to the preferred embodiment, the porous capillary diversion layer 13 is made by sintering a copper powder, a nickel powder, a silver powder, a metallic powder plated with copper, nickel, or silver, or other similar metallic powders.

Figure 6:
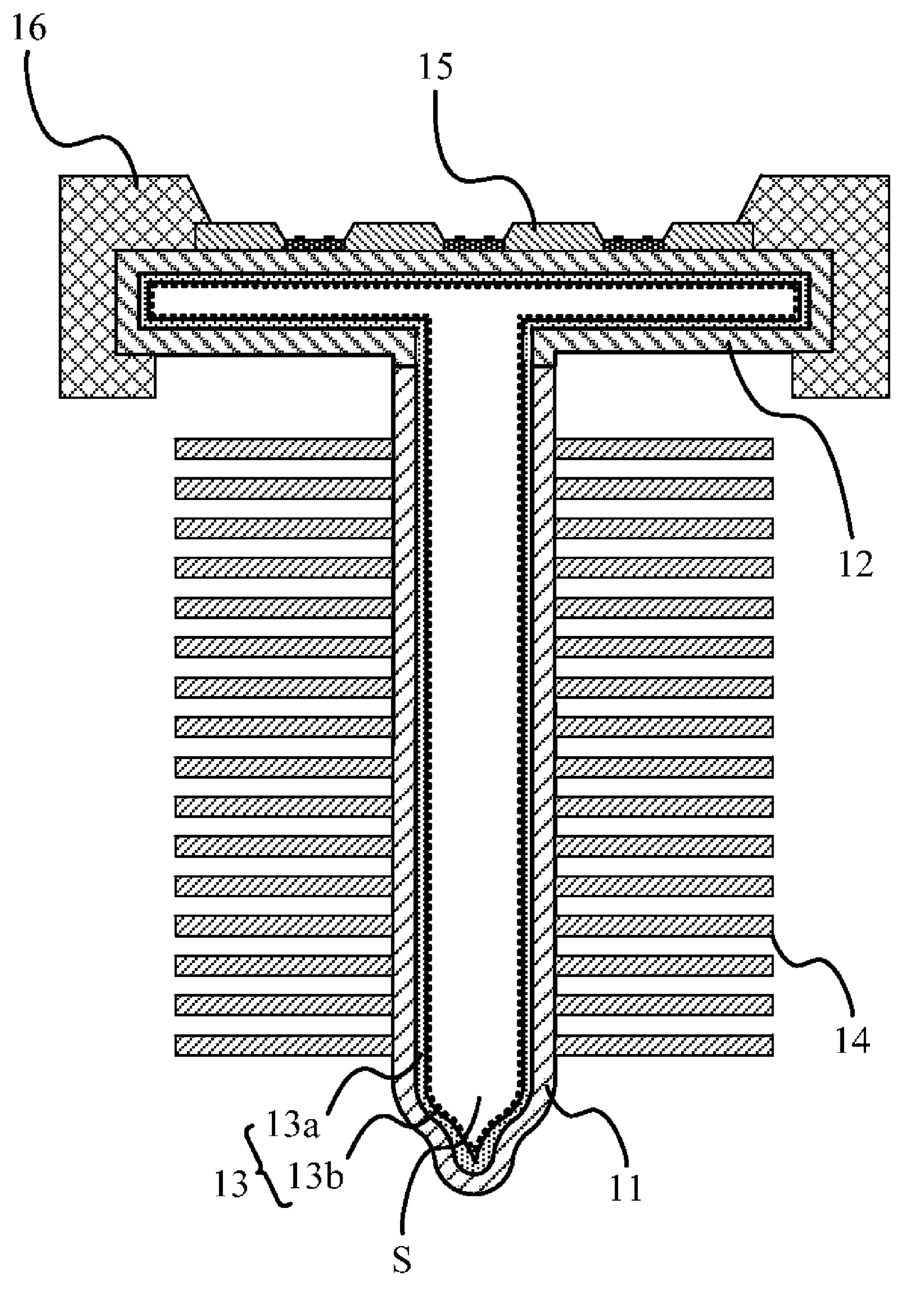
FIG. 6 illustrates a sketch diagram of a porous capillary diversion layer of the light-emitting diode illumination apparatus.

The porous capillary diversion layer 13 could be the following structure. It includes a metallic particle layer 13*a* and a metallic net 13*b*. The metallic particle layer 13*a* is formed on an inner wall of the tube 11 and an inner wall of the chamber 12 by sintering and the metallic net 13*b* is disposed on the metallic particle layer 13*a* to form the porous capillary diversion layer 13, as shown in FIG. 6.

Figure 7:
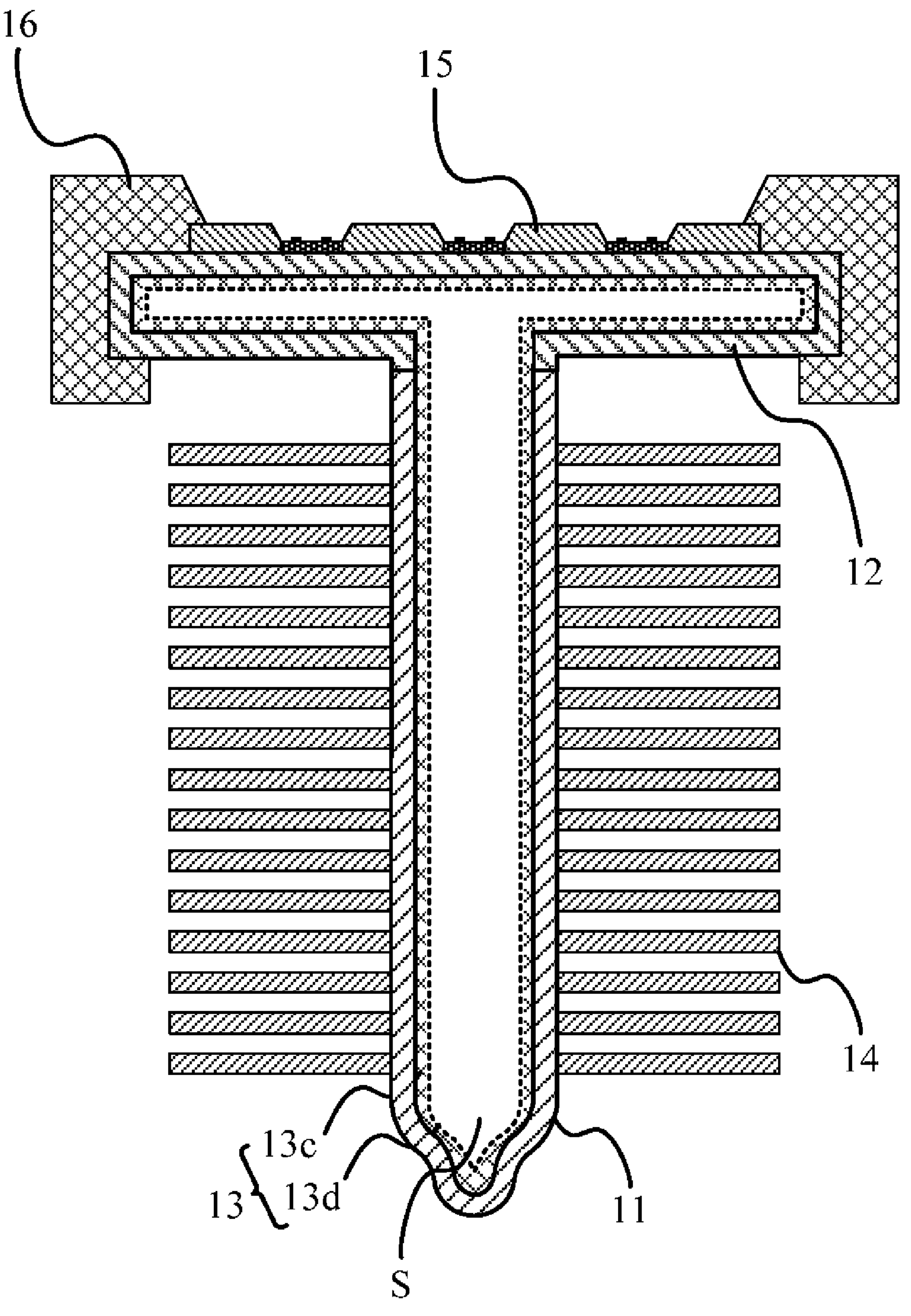
FIG. 7 illustrates another sketch diagram of a porous capillary diversion layer of the light-emitting diode illumination apparatus.

The porous capillary diversion layer 13 could be the following structure, too. The porous capillary diversion layer 13 includes a wavy craped metal cloth 13*c* and a flat metal net fabric layer 13*d*, the wavy craped metal cloth 13*c* is spread on an inner wall of the tube 11 and an inner wall of the chamber 12, and the flat metal net fabric layer 13 is disposed on the wavy craped metal cloth 13*c* to form the porous capillary diversion layer 13, as shown in FIG. 7. Therein the shape of the wave craped metal cloth 13*c* could be triangle, rectangle, trapezoid or waviness.

The porous capillary diversion layer 13 could include several tiny nicks formed on an inner wall of the tube 11 and an inner wall of the chamber 12, as shown in FIG. 1A.

Figure 8:
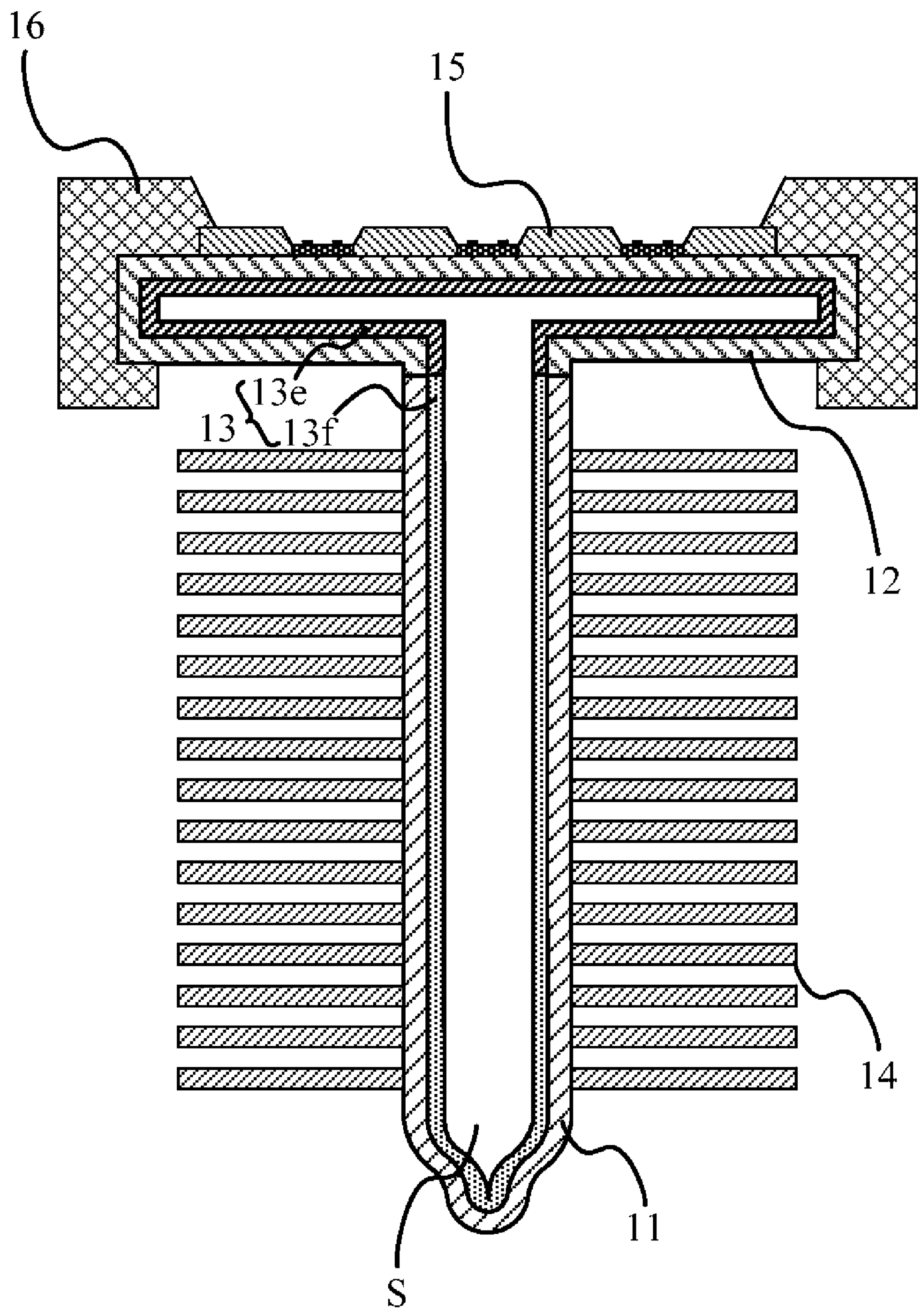
FIG. 8 illustrates another sketch diagram of a porous capillary diversion layer of the light-emitting diode illumination apparatus.

The porous capillary diversion layer 13 could be the following structure. It includes several tiny nicks 13*e* and a sintered metal layer 13*f*, the tiny nicks 13*e* are formed on an inner wall of the chamber 12, and the sintered metal layer 13*f* which is formed on an inner wall of the tube 11 is welded with the tiny nicks 13*e*, as show in FIG. 8.

Additionally, the shapes of the heat-dissipation fins 14 according to the preferred embodiment are irregular shapes, disc or mixing the two for adapting different shapes of spaces.

Therefore, the light-emitting diode illumination apparatus could dissipate heat directly and rapidly through the sealed space which is formed by the tube the chamber. Moreover, the light-emitting diode illumination apparatus could carry a diode light-emitting module with a larger generating heat area or several diode light-emitting modules through the flat end of the chamber. In other word, the light-emitting diode illumination module of the present invent provides higher illumination and the volume of the light-emitting diode illumination apparatus is smaller than others relatively.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A light-emitting diode illumination apparatus comprising:

a cylinder tube comprising a first opening;

a chamber comprising a second opening and a flat end, the second opening being engaged to the first opening;

a porous capillary diversion layer formed in the tube and the chamber, wherein the tube and the chamber form a sealed space, the sealed space accommodates a working fluid, and a cross-section area of the chamber is larger than a cross-section area of the tube;

at least one heat-dissipating fin disposed on a circumference of the tube; and a diode light-emitting module disposed on the flat end, the diode light-emitting module comprising a substrate and a plurality of light-emitting diode dies disposed thereon, wherein all of the plurality of light-emitting diode dies are disposed within the peripheral of the cross-section area of the chamber.

2. The light-emitting diode illumination apparatus of claim 1, wherein the tube and the chamber are formed in one piece.

3. The light-emitting diode illumination apparatus of claim 1, wherein the chamber comprises a recess and a cover, and the cover is engaged to the recess and comprises the second opening.

4. The light-emitting diode illumination apparatus of claim 3, wherein the chamber is made through a process of powder metallurgy process, stamping process, injection molding process, casting process, or machining process.

5. The light-emitting diode illumination apparatus of claim 1, wherein the porous capillary diversion layer is made by sintering a copper powder, a nickel powder, a silver powder, a metallic powder plated with copper, nickel, or silver, or other similar metallic powders.

6. The light-emitting diode illumination apparatus of claim 1, wherein the porous capillary diversion layer comprises a metallic particle layer and a metallic net, the metallic particle layer is formed on an inner wall of the tube and an inner wall of the chamber by sintering, and the metallic net is disposed on the metallic particle layer.

7. The light-emitting diode illumination apparatus of claim 1, wherein the porous capillary diversion layer comprises a wavy craped metal cloth and a flat metal net fabric layer, the wavy craped metal cloth is spread on an inner wall of the tube and an inner wall of the chamber, and the flat metal net fabric layer is disposed on the wavy craped metal cloth.

8. The light-emitting diode illumination apparatus of claim 1, wherein the porous capillary diversion layer comprises a plurality of tiny nicks formed on an inner wall of the tube and an inner wall of the chamber.

9. The light-emitting diode illumination apparatus of claim 1, wherein the porous capillary diversion layer comprises a plurality of tiny nicks and a sintered metal layer, the tiny nicks are formed on an inner wall of the chamber, and the sintered metal layer which is formed on an inner wall of the tube is welded with the tiny nicks.

10. The light-emitting diode illumination apparatus of claim 1, wherein the diode light-emitting module further comprises:

a substrate carrier comprising a sunken portion, wherein the substrate is disposed in the sunken portion.

11. The light-emitting diode illumination apparatus of claim 10, wherein the at least one light-emitting diode die is formed on the substrate through a flip-chip process.

12. The light-emitting diode illumination apparatus of claim 10, wherein the substrate is made of a silicon material or a metallic material.

13. The light-emitting diode illumination apparatus of claim 1, wherein the diode light-emitting module comprises:

a plurality of substrates;

a plurality of light-emitting diode dies disposed on the substrate; and a substrate carrier comprising a plurality of sunken portions, wherein the substrates are disposed in the sunken portions respectively.

14. The light-emitting diode illumination apparatus of claim 1, further comprising a supporting member, wherein the supporting member comprises a hole, the supporting member is disposed on the flat end, and the diode light-emitting module is disposed in the hole.

15. The light-emitting diode illumination apparatus of claim 1, wherein the diode light-emitting module comprises a light-emitting diode or a laser diode.

16. The light-emitting diode illumination apparatus of claim 1, wherein the diode light-emitting module comprises a red light-emitting diode, a blue light-emitting diode, a green light-emitting diode or a white light-emitting diode.

17. The light-emitting diode illumination apparatus of claim 1, wherein a shape of the at least one heat-dissipating fin is irregular shape.

18. The light-emitting diode illumination apparatus of claim 1, wherein a shape of the at least one heat-dissipating fin is disc.

19. The light-emitting diode illumination apparatus of claim 1, further comprising an optic module disposed above the diode light-emitting module.

20. The light-emitting diode illumination apparatus of claim 1, further comprising a control circuit module for controlling light emission of the diode light-emitting module.

* * * * *